United States Patent [19]
Maeda et al.

[11] 4,047,552
[45] Sept. 13, 1977

[54] PNEUMATIC RADIAL TIRE FOR HEAVY LOAD VEHICLES

[75] Inventors: Muneyoshi Maeda, Higashi-Murayama; Shigeo Watanabe, Kokubunji; Hidenori Takahashi, Tokorozawa; Toshiyuki Sogi, Higashi-Yamato, all of Japan

[73] Assignee: Bridgestone Tire Company Limited, Kyobashi, Japan

[21] Appl. No.: 712,294

[22] Filed: Aug. 6, 1976

[30] Foreign Application Priority Data
Aug. 12, 1975  Japan .................................. 50-97132

[51] Int. Cl.$^2$ .............................................. B60C 9/18
[52] U.S. Cl. ....................... 152/361 R; 152/361 DM; 152/354
[58] Field of Search ..... 152/361 R, 361 FP, 361 DM, 152/354, 355, 356, 357

[56] References Cited
U.S. PATENT DOCUMENTS

| | | | |
|---|---|---|---|
| 1,616,069 | 2/1927 | Tuttle et al. | 152/357 R |
| 1,818,950 | 8/1931 | Handy | 152/361 R |
| 3,392,774 | 7/1968 | LeBosse | 152/361 R |
| 3,989,083 | 11/1976 | Chrobak | 152/361 R |

Primary Examiner—Drayton E. Hoffman
Attorney, Agent, or Firm—Sughrue, Rothwell, Mion, Zinn and Macpeak

[57] ABSTRACT

A pneumatic radial tire for heavy load vehicles comprises a carcass and a belt for reinforcement of the carcass, said belt including tension members composed of at least two rubberized metal cords crossing with each other at a cord angle of not more than 25° with respect to equatorial plane of tire, in which said metal cords is coated with a rubber having a modulus of elasticity of 40–80 Kg/cm$^2$, a distance between the cords in each tension member is widened to 0.2–0.75 d based on a diameter $d$ of the cord, and an interlaminar cord distance D between the tension members is uniformly shortened to 0.2–0.4 d at a central region extending within 50–80% of a superposed width of the tension members.

5 Claims, 6 Drawing Figures

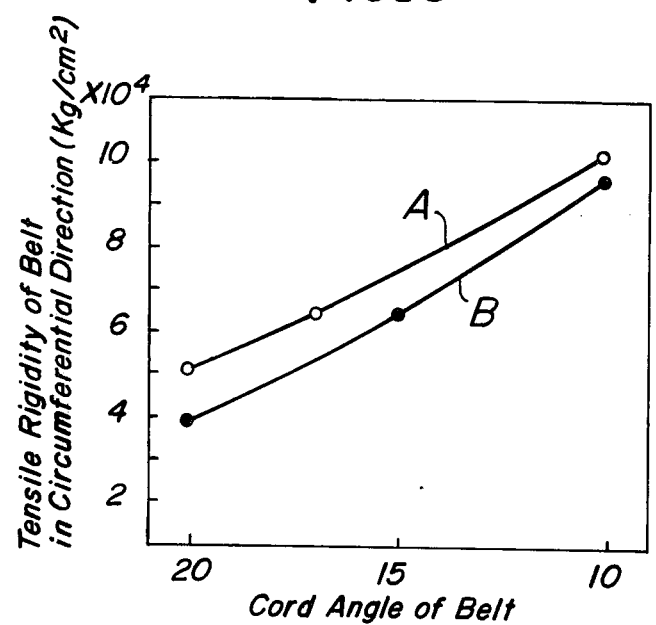

PNEUMATIC RADIAL TIRE FOR HEAVY LOAD VEHICLES

BACKGROUND OF THE INVENTION

1. Field of the Invention

The present invention relates to pneumatic radial tires for heavy load vehicles and more particularly to pneumatic radial tires for heavy load vehicles, which are especially suited for large-sized vehicles such as truck, bus and the like and comprise a carcass reinforced with a belt including rubberized metal cords as a tension member.

2. Description of the Prior Art

Generally, there are provided two reinforcements in the pneumatic radial tire, one of which is a carcass composed of ply cords lying in a radial plane of the tire or forming a small angle with said plane and the other of which is a belt disposed between the carcass and a tread rubber layer and including at least two rubberized cord fabrics as tension members crossing with each other at a small cord angle of not more than 25° with respect to equatorial plane of the tire.

This belt exclusively bears a tensile force in the circumferential direction of the tire because the ply cords of the carcass are disposed so as to lie in a radial plane or form a very small angle with said plane. Therefore, the belt is substantially different in function from a breaker in pneumatic bias tires bearing the tensile force in circumferential direction together with a carcass ply.

Preferably, in the radial tires for heavy load vehicles such as truck, bus and the like, metal cords are employed as a reinforcement of the belt. In this case, a strong reinforcing effect is obtained in a tread portion, so that many excellent properties such as wear resistance, puncture resisting property and the like are developed.

Among such properties, however, there are still remaining various problems.

Namely, the radial tire is expensive as compared with the bias tire and hence it cannot be said that the radial tire is always dominant in view of cost though the wear resistance is a catch phrase in the radial tire.

Further, the wear resistance is relative to a tensile rigidity in the circumferential direction of the belt. Therefore, in order to enhance the wear resistance, there has been attempted to make small an array angle of metal cords with respect to equatorial plane of tire or to increase the count of metal cords used or the ply number of metal cord fabrics. However, when the array angle of metal cords in the belt is small, shear strain in both circumferential and radial directions are excessively caused in the vicinity of both edges of the belt during the rotational movement of tire under a load to bring about an interlaminar separation of the tension members, whereby the life of the tire is excessively deteriorated. Furthermore, the increase of the cord count or ply number not only causes the increase in the weight and cost, but also strongly tends to bring about the separation.

In the initial stage of the separation, cracks are caused between the metal cord and the rubber coated thereon. Then, these cracks are propagated between the adjacent metal cords so as to promote the separation. For this reason, the excessive increase of the cord count rather results in the promotion of the separation, while the increase of the ply number causes an advance of heat build up due to inner friction, thus resulting in the development of the separation.

SUMMARY OF THE INVENTION

It is therefore an object of the present invention to provide an improved pneumatic radial tire for heavy load vehicles in which an effective reduction of tire weight is accomplished by the provision of effective reinforcing structure in the belt, especially the tension member bearing the tensile force in the circumferential direction and at the same time the wear resistance of the tire is improved by the enhancement of tensile rigidity in the circumferential direction of the belt.

According to the present invention, it has been discovered that the count of metal cords used in the tension member of the belt is rather decreased and the decrease of tensile rigidity in the circumferential direction is covered by an appropriate selection of properties of coating rubber and by shortening the interlaminar cord distance between the tension members, whereby the wear resistance of the pneumatic radial tire for heavy load vehicles can be more improved.

That is, the present invention provides a pneumatic radial tire for heavy load vehicles comprising a carcass composed of ply cords lying in the radial plane of the tire or forming a very small angle with said plane and a belt for reinforcement of the carcass including tension members composed of at least two rubberized metal cords crossing with each other at a cord angle of not more than 25° with respect to equatorial plane of tire, characterized by coating said metal cords of said tension members with a rubber having a modulus of elasticity of 40–80 Kg/cm², and by widening a distance W between the cords in each of said tension members to $0.2$–$0.75\ d$ based on a diameter $d$ of said metal cord, and by uniformly shortening an interlaminar cord distance D between said tension members to $0.2$–$0.4\ d$ at a central region extending within 50–80% of a superposed width of the tension members, and by gradually separating said tension members with respect to each other from said central region toward both edges thereof.

BRIEF DESCRIPTION OF THE DRAWINGS

The invention will now be described in greater detail with reference to the accompanying drawings, wherein:

FIG. 6 is a graph showing a relationship between the cord angle and the tensile rigidity in the circumferential direction of the belt in the tires of the present invention and the prior art.

DESCRIPTION OF THE PREFERRED EMBODIMENTS

The inventors have made various studies with respect to the structure of the belt in this type of the conventional pneumatic radial tire for heavy load vehicles and as a result, it has been found out that the interlaminar cord distance between the tension members, cords of which are crossed with each other at a small angle with respect to circumferential direction of tire, i.e. at a cord angle of not more than 25° with respect to equatorial plane, among the reinforcing layers for the belt composed of rubberized metal cords plays an important role for the tensile rigidity of the belt in the circumferential direction of the tire in connection with the diameter of the metal cord in the reinforcing layer.

Figure 1:
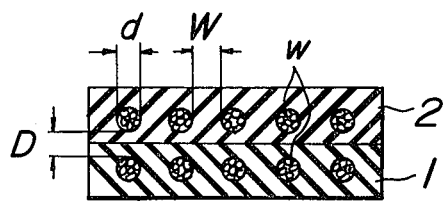
FIG. 1 is a cross-sectional view of an essential part of tension members constituting a belt.

Referring to FIG. 1, there is shown in section an essential part of tension members 1, 2 with metal cord arrays crossing with each other, which are located at second and third positions outwardly from the inside of tire in the common belt reinforcement with a four laminated structure. In this figure, an illustration of the first and fourth reinforcing layers is omitted. Symbol $w$ represents a metal cord, symbol $d$ a diameter of the metal cord, symbol D an interlaminar cord distance between the tension members 1 and 2 and sumbol W a distance between the metal cords in each of the tension members 1 and 2.

From the results of various experiments with respect to the distance D, it has been found out that when a thickness of a coating rubber is so selected that the ratio D/d is 0.2–0.4, preferably about 0.35, the tensile rigidity in the circumferential direction is effectively enhanced. When the ratio D/d exceeds 0.4, the tensile rigidity in the circumferential direction capable of maintaining a higher wear resistance cannot be obtained, while when the ratio D/d is less than 0.2, there are caused troubles in the adhesion of metal cord to rubber, production step and the like.

With the above mentioned range of the ratio D/d, the properties of the coating rubber are particularly important together with the structure of the metal cords $w$. In this connection, it has been found out that the use of a rubber having a modulus of elasticity of 40–80 Kg/cm$^2$, preferably 50–65 Kg/cm$^2$ is suited for the object of the present invention. When the modulus of elasticity is less than 40 Kg/cm$^2$, the movement of the metal cords becomes larger during the rotational movement of tire, while when the modulus of elasticity exceeds 80 Kg/cm$^2$, workabilities in operations, particularly rubber kneading, sheeting and coating operations are damaged.

When the tension members 1, 2 are formed by coating the metal cords with the rubber having the modulus of elasticity of 40–80 Kg/cm$^2$ at a thickness corresponding to the ratio D/d of 0.2–0.4, the tensile rigidity in circumferential direction of the belt is found to be increased to about 1.5 times or more as compared with that of the conventional belt.

The term "modulus of elasticity" used herein means a value at 100% modulus obtained by dividing a tensile force required for elongating an original length of rubber specimen to two times length by a sectional area of the rubber specimen.

Even if the belt is made from the tension members 1 and 2 satisfying the ratio D/d of 0.2–0.4 and the modulus of elasticity in the coating rubber of 40–80 Kg/cm$^2$, it has been proved that there is still a fear causing a separation in each of the tension member layers 1 and 2.

This separation is considered to be due to the fact that shear strain in both circumferential and radial directions is caused by a compression force acting to the belt during the rotational movement of tire under a load and concentrates around the metal cord $w$ at an initial stage, whereby cracks are formed between the metal cord and the rubber coated thereon and thereafter, these cracks extend in the widthwise direction of the belt between the adjacent metal cords $w$, $w$ and communicate with each other to finally cause the separation.

In order to prevent the occurrence of such separation, the inventors have made various studies with respect to a relationship between the distance W between the metal cords in the tension member 1 or 2 and the diameter d of the metal cord and as a result, it has been found out that when the ratio W/d is 0.2–0.75, preferably 0.25–0.40, the separation can be advantageously avoided while maintaining the tensile rigidity in the circumferential direction of the belt.

When the ratio W/d is less than 0.2, the count of metal cords used becomes larger, so that it is very difficult to prevent the occurrence of cracks around the metal cord $w$ and hence the subsequent advance of the separation. While, when the ratio W/d exceeds 0.75, the tensile rigidity in the circumferential direction of the belt lowers to such an extent that the wear resistance of the tire cannot be maintained at a given limit.

As mentioned above, the effective reinforcement of the belt in the pneumatic radial tire for heavy load vehicles according to the present invention is particularly accomplished by applying a coating rubber with the modulus of elasticity of 40–80 Kg/cm$^2$ on the tension members composed of at least two rubberized metal cords crossing with each other at a cord angle of not more than 25° with respect to equatorial plane of tire and by limiting the ratio D/d of the interlaminar cord distance between the tension members to the diameter of the metal cord to a range of 0.2–0.4. Further, the tensile rigidity in circumferential direction of the belt is improved by limiting the ratio W/d of the distance between the cords in the tension member to the diameter of the metal cord to a range of 0.2–0.75 so as to prevent the occurrence of the separation in the tension member and to aid the enhancement of the wear resistance. Thus, the present invention makes it possible to reduce the count of metal cords used and hence the weight of the tire.

Next, the inventors have made various experiments with respect to the resistance of the belt to end separation, which is a final important problem relating to the separation, by combining the above mentioned belt with the usual carcass to prepare a radial tire of a size TBR 10.00 R 20 and subjecting the resulting tire to a room drum test (a running distance up to occurrence of trouble at a speed of 65 Km/hour under a load of 4,740 Kg is an indication of characteristics of the tire). As a result, it has been found out that the occurrence of interlaminar cracks between the tension members are observed at both edges of the belt due to concentration of shear strain in circumferential and radial directions of the tire.

Such interlaminar cracks gradually develop and finally bring about the occurrence of end separation in the tension member.

Figure 2:
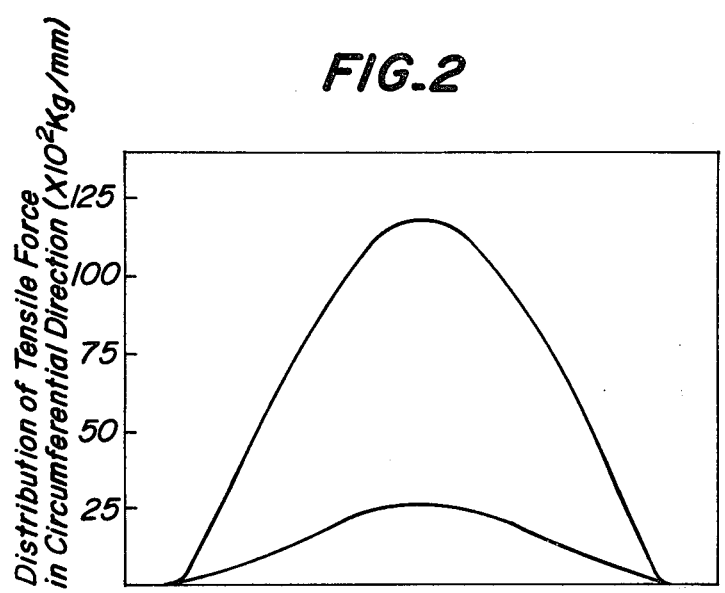
FIG. 2 is a graph showing a distribution of tensile force in the circumferential direction of the belt.

In order to solve this problem, the inventors have aimed at the distribution of tensile force in the circumferential direction acting to the belt and made various studies with respect to this distribution. As a result, it has been found out that the tensile force in the circumferential direction is not actually born at both ends in the widthwise direction of the belt as shown in FIG. 2.

A series of experiments was made with respect to the belts of various sizes and as a result, it has been found that the effective width $B_1$ of the belt is about 80% based on the superposed width B of the tension members 1, 2 crossing with each other at a given cord angle in the widthwise direction of the tire.

This fact was again examined with respect to the above mentioned ratio D/d. As a result, it has been found that the thickness of the coating rubber corresponding to the ratio D/d of 0.2–0.4 is sufficient to be applied only to a central region of the belt corresponding to the effective width $B_1$, and the width of the central region is not less than 50% of the belt width B so as to improve the tensile rigidity in circumferential direction to a given extent.

When the ratio D/d of 0.2–0.4 is applied to the belt width of less than 50%, the tensile rigidity of the belt becomes insufficient as mentioned on the case that the ratio D/d exceeds 0.4.

That is, the above mentioned ratio D/d is not necessary to be applied over a whole belt width, but is applied only at the central region corresponding to 50–80% of the belt width in view of the improvement of the tensile rigidity in the circumferential direction. Therefore, the thickness of the rubber can be increased at both ends of the belt except for the central region in order to prevent the occurrence of the separation.

In this connection, it has been proved from the experimental results that when the thickness of rubber at both ends is 1.5–7.5 times, preferably 3–5.5 times of the ratio D/d in the effective width, i.e. the distance D is 0.3–3.0 d, there is advantageously avoided the interlaminar separation between the tension members of the belt caused by the shear strain in the circumferential and radial directions during the rotational movement of tire under a load.

When the distance D exceeds 3.0 d, a given value of skid base gauge (i.e. gauge from the bottom of groove to the outermost coating rubber in the belt) is hardly obtained at the position of the groove in a shoulder portion. Further, when the depth of the groove is shallow, the life of the tire is sacrificed. While, when the distance D is less than 0.3 d, a mitigating action to the shear strain becomes poor.

Figure 3:
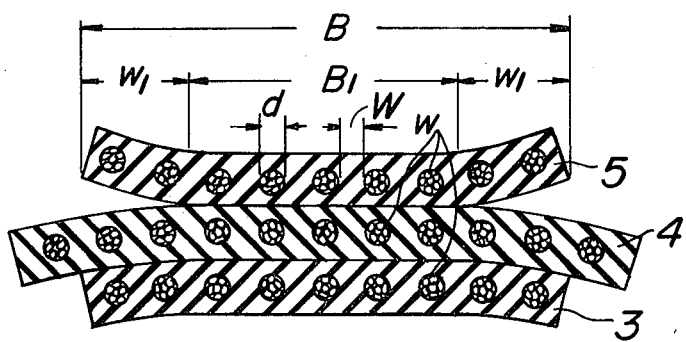
FIG. 3 is a cross-sectional view of an embodiment of laminated tension members constituting the belt according to the present invention.

In FIG. 3 is diagrammatically shown a concrete embodiment of the belt satisfying the constructional requirement of the belt reinforcement according to the present invention as mentioned above in detail.

Such a belt is applied to, for example, a radial tire of a size TBR 10.00 R 20, in which three reinforcing layers are used although the conventional belt has usually four reinforcing layers.

In this embodiment, the first reinforcing layer 3 facing to the carcass has a width of 155 mm and a cord angle of 67° inclined leftwardly with respect to equatorial plane of tire. On the contrary, the second and third reinforcing layers, i.e. the tension members 4 and 5 superposed with each other at the tread portion and bearing the tensile force in the circumferential direction have widths of 175 mm and 155 mm, respectively and the array angles of metal cords w are inclined 18° leftwardly and rightwardly with respect to the equatorial plane, respectively. In the second and third layers, the diameter d of the metal cord is 1.5 mm and the distance W between the cords in each layer is 0.53 mm and hence the ratio W/d is 0.353. Further, the rubber thickness between the cords in the second and third layers, i.e. the distance D is 0.53 mm and hence the ratio D/d is 0.353. This rubber thickness extends over the central region corresponding to 80% of the belt width B. The both ends of the second and third layers 4, 5 are separated from each other as shown in FIG. 3 to such an extent that the interlaminar cord distance at both ends is about 5 times of the distance D.

As the metal cord, the structure of $1 \times 3 + 6$ is used, and the coating rubber has a modulus of elasticity of 60 Kg/cm².

Moreover, symbol $w_1$ represents a portion of the belt corresponding to a width $(B - B_1)$ of the belt and bearing mainly the wear resistance of tire.

Figure 4:
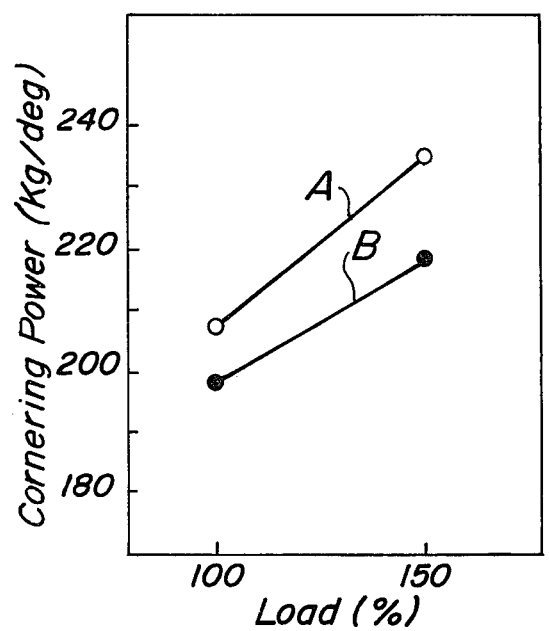
FIG. 4 is a graph showing a relationship between the cornering power and the load in the tires of the present invention and the prior art.

In FIG. 4, the cornering power (CP) is compared with respect to the tire A having the above mentioned belt reinforcement according to the present invention and the tire B of the prior art comprising the belt composed of four tension members.

The tire B has the radial carcass structure similar to the tire A except that a further layer having a width of 75 mm and a cord angle of 18° inclined rightwardly with respect to equatorial plane of tire is disposed on the third layer at a crown center so as to form a belt structure having the ratios W/d and D/d of 0.107 and 0.47, respectively.

As seen from FIG. 4, the cornering power (CP) of the tire A according to the present invention is considerably superior to that of the prior art tire B under a common load. This CP value is well-known to be a measure of wear resistance.

Figure 5:
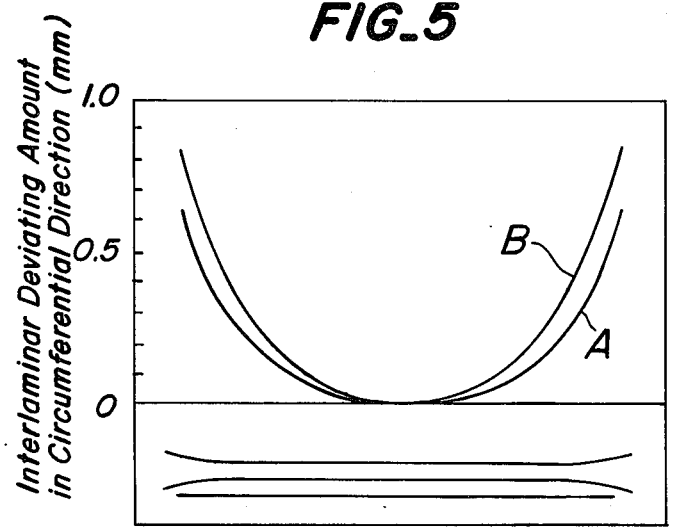
FIG. 5 is a graph showing an interlaminar deviating amount between the tension members in circumferential direction of the tires of the present invention and the prior art.

In FIG. 5, the shear strain in the circumferential direction between the tension members 4 and 5 having cord arrays crossing with each other is expressed by an interlaminar deviating amount in the circumferential direction between the tension members 4, 5 at each cross-sectional position of tire. This test is carried out under such conditions that an inflation pressure is 7.25 Kg/cm², a load is 2,445 Kg and a rim to be used is 7.50 V 20.

As seen from FIG. 5, the interlaminar deviating amount of the tire A according to the present invention is smaller than that of the prior art tire B, so that according to the present invention the tendency of causing the separation of the tension members at both end portions of the belt can be effectively restrained.

FIG. 6 shows comparative results of the tire A with the tire B with respect to the relationship between the cord angle of the metal cords constituting the tension member of the belt with respect to the equatorial plane of the tire and the tensile rigidity in the circumferential direction. As seen from this figure, according to the present invention, a higher tensile rigidity in circumferential direction can be obtained notwithstanding the ply number of the tension members for the belt and the count of the metal cords used are less and the thickness of the belt is thin. Further, the same rigidity is obtained with a larger cord angle, so that the concentration of the shear strain in the circumferential and radial directions to both ends of the belts can advantageously be avoided.

When the tire A according to the present invention is compared with the tire B of the prior art by room drum test, the running distance of the tire B is 6,200 Km, while that of the tire A is 8,300 Km, so that the resistance to separation is improved about 35% according to the present invention. Furthermore, when the practical road test is carried out by using a large vehicle provided with 10 tires at a speed of 50–80 Km/hr under 140% load, the wear resistance of the tire A is considerably increased to 120 based on 100 of index of the wear resistance of the prior art.

According to the present invention, the reduction of tire weight is not only accomplished by reducing the ply number of tension members for the belt, but also the following merits are developed as compared with the tire B of the prior art, whereby performances of the tire are finally improved considerably.

1. The weight is lowered by 12%.
2. The rolling resistance is elevated.
3. The resistance to separation between the tension members in the belt is improved about 30–40%.
4. The wear resistance is improved about 20% as compared with that of the prior art.
5. The improvement in view of the production and shaping ability is recognized.

What is claimed is:

1. A pneumatic radial tire for heavy load vehicles comprising a carcass composed of ply cords lying in a radial plane of the tire or forming a very small angle with said plane and a belt for reinforcement of said carcass including tension members composed of at least two rubberized metal cords crossing with each other at a cord angle of not more than 25° with respect to the equatorial plane of the tire, characterized by coating said metal cords of said tension members with a rubber having a modulus of elasticity of 40–80 Kg/cm$^2$, and by widening a distance W between the cords in each of said tension members to 0.2–0.75 $d$ based on a diameter $d$ of said metal cord, and by uniformly shortening an interlaminar cord distance D between said tension members to 0.2–0.4$d$ at a central region extending within 50–80% of a superposed width of said tension members, and by gradually separating said tension members with respect to each other from said central region toward both edges thereof.

2. A pneumatic radial tire as claimed in claim 1, wherein said modulus of elasticity of said rubber is 50–65 Kg/cm$^2$.

3. A pneumatic radial tire as claimed in claim 1, wherein said distance W between the cords in each of said tension members is 0.25–0.40 $d$.

4. A pneumatic radial tire as claimed in claim 1, wherein said interlaminar cord distance D is about 0.35 $d$.

5. A pneumatic radial tire as claimed in claim 1, wherein between said tension members separated with each other from said central region toward both edges thereof is coated a rubber at such a thickness that said interlaminar cord distance D is 0.3–3.0 $d$, preferably 0.6–2.2 $d$.

* * * * *